(12) United States Patent
Baur et al.

(10) Patent No.: US 6,210,298 B1
(45) Date of Patent: Apr. 3, 2001

(54) CONTINUOUSLY VARIABLE TRANSMISSION

(75) Inventors: Erwin Baur; Franz Müller, both of Friedrichshafen; Helmut Konrad, Aulendorf, all of (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/445,503

(22) PCT Filed: Jun. 27, 1998

(86) PCT No.: PCT/EP98/03937

§ 371 Date: Dec. 8, 1999

§ 102(e) Date: Dec. 8, 1999

(87) PCT Pub. No.: WO99/01681

PCT Pub. Date: Jan. 14, 1999

(30) Foreign Application Priority Data

Jul. 4, 1997 (DE) .............................................. 197 28 611

(51) Int. Cl.[7] .................................................. F16H 37/02
(52) U.S. Cl. .............................................................. 475/211
(58) Field of Search ..................................... 475/210, 211, 475/218, 302

(56) References Cited

U.S. PATENT DOCUMENTS

| | | | |
|---|---|---|---|
| 3,340,749 | 9/1967 | Magg et al. | 74/689 |
| 3,479,908 | * 11/1969 | Kress et al. | 475/211 |
| 4,290,320 | * 9/1981 | Abbott | 475/211 X |
| 4,644,820 | * 2/1987 | Macey et al. | 475/211 |
| 4,864,889 | * 9/1989 | Sakakibara et al. | 475/211 |
| 5,690,576 | * 11/1997 | Moroto et al. | 475/211 |
| 5,944,628 | * 8/1999 | Lee | 475/210 X |
| 5,980,414 | * 11/1999 | Larkin | 475/211 |
| 6,036,616 | * 3/2000 | McCarrick et al. | 475/210 X |
| 6,106,428 | * 8/2000 | Koneda et al. | 475/210 |

FOREIGN PATENT DOCUMENTS

| | | |
|---|---|---|
| 16 25 030 | 2/1970 | (DE) . |
| 2651629 | * 5/1977 | (DE) ................................ 475/211 |
| 39 29 209 | 3/1990 | (DE) . |
| 43 08 761 | 9/1994 | (DE) . |
| 196 31 294 | 2/1997 | (DE) . |
| 0 185 463 | 6/1986 | (EP) . |
| 0 308 078 | 3/1989 | (EP) . |
| 0 748 954 | 12/1996 | (EP) . |
| 094021941 | * 9/1994 | (WO) ................................ 475/211 |
| 95 14 183 | 5/1995 | (WO) . |

* cited by examiner

Primary Examiner—Charles A Marmor
Assistant Examiner—Roger Pang
(74) Attorney, Agent, or Firm—Davis & Bujold, P.L.L.C.

(57) ABSTRACT

The invention relates to a continuously variable transmission with two driving modes designed as split power transmission comprising a power branch in the form of a variator with a continuously adjustable rotational speed and a mechanical power branch. The mechanical power branch and the variator are coupled in the first driving mode with a compound gear. The mechanical power branch is opened in the second driving mode and the total power is directly transmitted by the variator. Both driving modes can be switched by clutches K1 and K2 and can be optionally connected to the transmission input shaft (1) by means of a clutch Kv for forward drive and via a clutch Kr for reverse drive. The clutches Kv and Kr are designed as a twin clutch which acts as a start clutch and as a reverse unit.

7 Claims, 1 Drawing Sheet

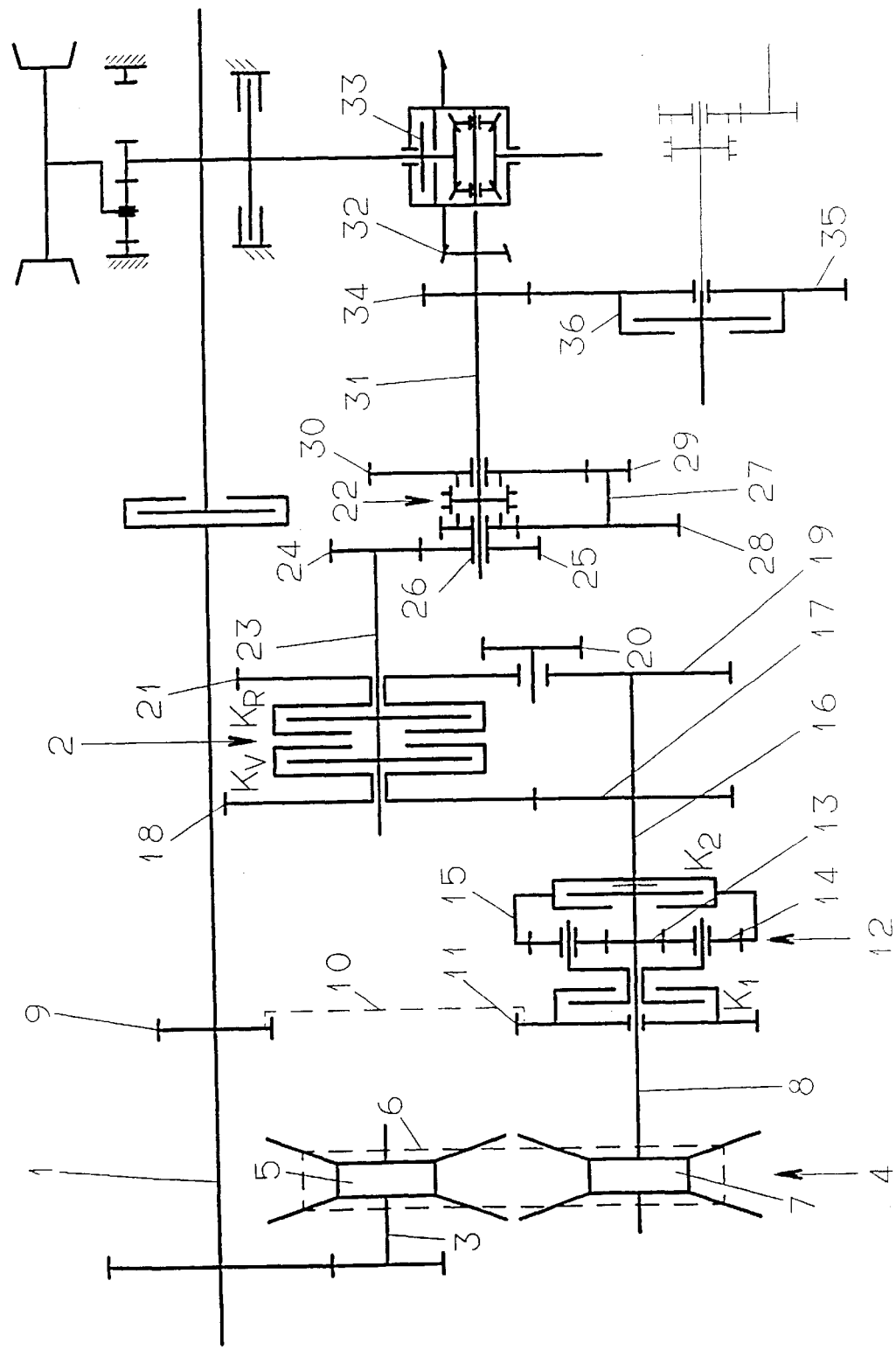

CONTINUOUSLY VARIABLE TRANSMISSION

BACKGROUND OF THE INVENTION

A continuously variable transmission has been described in U.S. Pat. No. 3,340,749. This continuously variable transmission is a power split transmission with three driving modes, a belt drive variator transmission and two mechanical power branches. A mechanical power branch can optionally be drivingly connected by clutches with the input shaft. The engaged mechanical branch and the power branch with continuously variable rotational speed of the belt drive transmission are combined to form a planetary transmission acting as compound gear. In another driving mode, both mechanical power branches are drivingly uncoupled by the input shaft and, by one other clutch, the shaft of the secondary bevelled pulley pair of the belt drive transmission is directly connected with the output shaft. The total power is thus transmitted, via the belt drive transmission, to the output shaft.

In transmissions of this kind, when the vehicle is parked, the variator, as a rule, is adjusted in a manner such that in the driving mode of the slowest speeds with limited transmission input rotational speed, the transmission output rotational speed is zero. To start, the clutch of the slowest driving mode is engaged when still inactive. The starting operation occurs by adjusting the variator. Thus the transmission output rotational speed increases in the compound gear. A slight adjustment of the variator results in a clear change of the total gear ratio. Thereby a regulated start becomes extremely difficult. In particular, a careful shunting is hard to control according to automatic control technology. In this range of very low output rotational speeds of the transmission with limited input rotational speeds, the torque on the variator is stronger than the torque on the transmission output. The variator is thus loaded with a very high torque with a stronger torque than in a direct drive, via the variator, without power split.

This difficult adjustability of the transmission when starting and the strong torque load of the variator constitute a considerable disadvantage.

The problem on which the invention is based is to provide a continuously variable transmission in which starting and reversing are easy to regulate and strong torques on the variator are prevented.

This problem is solved with a continuously variable transmission.

SUMMARY OF THE INVENTION

The continuously variable transmission, according to the invention, is a power split transmission having one power branch with continuously variable rotational speed in the form of a variator and one mechanical power branch. It has two driving modes. In the first driving mode, the mechanical power branch is drivingly connected, via a clutch K1, with a planetary transmission acting as compound gear. The secondary side of the variator is firmly connected with the compound gear. In the second driving mode, when the clutch K1 is opened, i.e. when the mechanical power branch is opened, a clutch K2 connects the output of the variator with the output of the planetary transmission. The two driving modes, shiftable by the clutches K1 and K2, can optionally be shifted by a clutch Kv for forward drive and by a clutch Kr for reverse drive in the driving train for forward and reverse drive. The clutches Kv and Kr are designed as twin clutches. The twin clutches are disposed in the power train after the variator and the mechanical power branch serves as start clutch and as reverse unit. This transmission arrangement offers the advantage that the variator rotates even when the twin clutches are uncoupled and thus are easy to adjust. A twin clutch is comparatively economical. It offers the added advantage that the draft torque, which mainly appear in case of viscous clutch oil due to low temperatures, mutually cancel each other. Such drag torques can lead to unintentionally moving the vehicle, especially when a creep speed group is engaged in the transmission. As starting elements, clutches are easy to control or regulate. To control or regulate clutches, it is possible to refer to a vast treasure of experience. Controls for reverses have also been well tried. A protected shunting with the time-tried draft of regulated or controlled start and reverse clutches is not problematic, according to the regulating technology or control technology. Thus have been overcome the technical problems of regulation or control of the starting of these power split transmission from the parked position by changing the adjustment of the variator.

The twin clutch is preferably given a robust design in a manner such that for any arbitrarily adjusted ratios in the first driving mode, it is exclusively possible to start or reverse by an actuation of the twin clutch without the ratio having to be adjusted therefor. The control and reversing operation, e.g. can thus take effect only by a control of the twin clutch without the variator adjustment having to be changed.

A speed increasing ratio is preferably disposed between the transmission input shaft and the variator, thereby the torque is reduced on the variator and its service life prolonged.

The variator is advantageously designed as a belt drive transmission. In another advantageous development of the invention, the variator is designed as a toroidal drive. This transmission is advantageously used in commercial vehicles for agriculture and forestry.

A creep speed group in countershaft design is preferably disposed on the output side of the twin clutch. Very low speeds, such as needed in a tractor when used in planting without very high requirements having to be set on the regulating precision of the variator, can be very accurately adjusted.

The ratio is laid out in a manner such that the total efficiency of the transmission is optimal in the most frequently used speed and traction ranges. The transmission spreading action in the driving mode with power split is greater than the variator spreading action. By virtue of the strong transmission spreading action, two driving modes of the continuously variable transmission are absolutely sufficient. The transmission thus can be very simply built. Compared to transmissions with more driving modes, many parts can be spared for teeth, clutches, etc. At the same time, the transmission ratio is laid out so as to limit the maximum torque acting on the variator by the slip limit between tire and ground or road. An overload of the variator is thus prevented.

The switching point at which the clutch K1 is closed and the clutch K2 opened or vice versa is advantageously selected so that sun gear, ring gear and planet carrier of the compound gear rotate synchronously, thereby a traction downfall or an interruption of the traction is prevented.

In order to overcome the problem of the difficult controllability and of the great torque increase, the ratio of output rotational speed of the transmission to the input rotational speed of the countershaft with limited input rotational speed is selected in an advantageous method above a preset minimum value.

Starting and reversing are a frequent operational state, e.g. in agricultural commercial vehicle in activities like loading or stacking. A rough, jerky start and reverse with imprecisely presettable end positions of the movement of the vehicle as can occur in the case of starting controls by upward regulation of the output rotational speed of the transmission beginning from zero by adjusting the variator can load to dangerous situations and is thus intolerable. Therefore, the starting advantageously takes effect by controlled or regulated closing of the clutch Kv or Kr, the reversing by controlled or regulated switching of the clutches Kv and Kr.

In an advantageous development of the invention, all rotating parts are placed over the oil sump. Thus churning losses are prevented and the efficiency favorably developed.

The hydraulic oil for the adjustment of the variator and the retaining pressure of the clutches are preferably made available by a suction-throttled radial piston pump. Thereby the power loss of the transmission is limited by the pump. On the other hand, the lubricating oil is advantageously supplied via an internally geared pump. By using two different pumps for hydraulic and lubricating oils, the total power loss through the pumps is reduced.

Mechanical torque regulators advantageously control the contact pressure in the variator. Mechanical torque regulators immediately react to the torque peaks and increase the contact pressure in the variator thereby preventing high frictional losses, but also a slip during torque peaks which does not only represent a sliding friction loss, but also abrades the variator.

The housing of the transmission preferably comprises three parts, including the rear axle part.

BRIEF DESCRIPTION OF THE DRAWINGS

One embodiment of the invention is shown in the drawing.

DESCRIPTION OF THE PREFERRED EMBODIMENT(S)

The FIGURE shows a power split transmission having one twin clutch as start and reverse unit.

An engine, not shown, drives the continuously variable transmission via an input shaft 1. The latter is drivingly connected, via spur gears, with a countershaft 3. The countershaft 3 drives a power split transmission having a power branch with continuously variable rotational speed in the form of a variator and a mechanical power branch. The variator is designed as belt drive transmission 4 which is comprised of a primary beveled pulley pair 5, a looping organ 6 and a secondary beveled pulley pair 7. The primary beveled pulley pair 5 is non-rotatably mounted upon the countershaft 3, the secondary beveled pulley pair 7 upon an intermediate shaft 8. Fixedly connected with the input shaft 1 is a spur gear 9 which, via a spur gear 10, drives an idler gear 11 co-axial relative to the intermediate shaft 8. The three gears 9, 10, 11 form the mechanical power branch of the power split transmission. These two power branches can be again combined to form a compound gear designed as planetary gear 12. The sun gear 13 of the planetary gear 12 is fixedly placed upon the intermediate shaft 8. The planet carrier 14 of the planetary gear 12 can be drivingly connected via a clutch K1 with the idler gear 11. The ring gear 15 of the planetary gear 12 is connected with one other intermediate shaft 16 via the secondary side of a clutch K2.

The primary side of said clutch K2 is placed upon the intermediate shaft 8. Thus, when the clutch K1 is opened, both intermediate shafts 8 and 16 can be connected to the direct through drive. The intermediate shaft 16 is drivingly connected via two spur gears 17, 18 or three spur gears 19, 20, 21 with a twin clutch 2 which consists of a clutch Kv for forward drive and a clutch Kr for reverse drive. The twin clutch 2 serves as start and reverse unit. It is robustly designed in a manner such that for arbitrarily adjusted ratios in the first driving range, the starting and reversing operations can take effect only by actuation of said twin clutch 2 without the ratio having to be adjusted therefor. On the output side of said twin clutch 2 is disposed a creep speed group 22 in countershaft design. The shaft 23 on the output side of the twin clutch 2 is here firmly connected with a spur gear 24 which meshes in a spur gear 25. The spur gear 25 is non-rotatably placed upon a hollow shaft 26 and meshed with the spur gear 18 situated on a countershaft 27 of the creep speed group 22. Upon the same countershaft 27 is firmly mounted a spur gear 29 which, in turn drives an idler gear 30. The hollow shaft 26 and the idler gear 30 can optionally be coupled with an output shaft 31. If the hollow shaft 26 is coupled, the creep speed group 22 is switched to through drive. If the idler gear 30 is coupled, the power flow extends over the countershaft of the creep speed group 22. The creep speed is thus engaged. The output shaft 31 is connected, via a beveled gear 32, with a rear-gear differential 33 and via spur gears 34 and 35 with an engagement clutch 36 for a forward drive.

The starting and acceleration with this continuously variable transmission form is as follows: the engine rotational speed is adjusted to a preset, consumption-optimized value. The belt drive transmission 4 is adjusted to its maximum ratio. The minimal ratio thus results according to the compound gear, but the twin clutch 2 is dimensioned so that for starting the minimal ratio has not necessarily to be adjusted. The clutch K1 is closed and the clutch K2 open. Depending on the travel direction, the clutch Kv for forward drive or the clutch Kr for reverse drive are energized with power. The maximum ratio of the belt drive transmission 4 is dimensioned precisely so that while the clutch is closed and at preset engine rotational speed, the transmission output rotational speed has a low value. This value, however, is not zero, while in power split transmissions the output rotational speed changes upon minimal ratio changes of the belt drive transmission. The sun gear 13 of the planetary transmission 12 rotates at the same time faster than the planet carrier 14 so that the planets rotate in a direction opposite to that of the sun gear or planet carrier. The maximum ratio of the belt drive transmission 4 and thus the rotational speed of the sun gear 13, compared to that of the planet carrier 14, is—as has been said—selected so that the ring gear 15 rotates very slowly in direction of the sun gear 13 and planet carrier 14. As soon as the clutch no longer slips during starting, the ratio of the belt drive transmission 4 is reduced, thus diminishes the rotational speed of the sun gear 13 whereby the reverse motion of the planetary gears becomes slows. Since the rotational speed of the planet carrier 14 is constant, the rotational speed of the ring gear 15 increases. When the ratio of the belt drive transmission 4 is minimal, the sun gear 13 and the planet carrier 14 equally rotate quickly. At the same time, the planetary gears stay still and the ring gear 15 thus rotates as quickly as the sun gear 13 and the planet carrier 14, i.e. the planetary transmission 12 rotates as a block. This is the range limit of the first range of the transmission, of the transmission with power split. The clutch K1 is now opened and the clutch K2 closed. The mechanical power branch is thus no longer drivingly connected with the compound gear, i.e. the spur gears 9, 10 and 11 idly rotate along. The clutch K2 connects the intermediate shafts 8 and 16 to direct through drive. The power flow is through the belt drive transmission 4. The reduction ratio of the belt drive transmission 4, in this second range of the transmission, is now increased for added acceleration beginning from its minimum value. If this transmission is used in agricultural commercial vehicles, the ratio is conveniently measured so that the first range serves for off road drive (farm group) and the second for roads (street group). In the first transmission range (farm group), the range with power split, the power to be transmitted via the belt drive transmission 4 for low drive speeds is more than the total input power. This is the range of the so-called apparent power which heavily loads the belt drive transmission 4. Accordingly, the belt drive transmission 4 must be constructed with very robust design while according to the invention, the whole transmission is designed precisely so that the driving force of the input gears in this range of apparent power is higher than the static friction. The static friction limit thus limits the slippage of the gears; the apparent power appearing in the drive belt transmission 4 in the sense that the belt drive transmission 4 still can be reasonably dimensioned. In these transmission dimensions, the driving speed most frequently found in the farmer group are precisely within a range in which the mechanical branch transmits the larger portion of the input power. Since the mechanical branch has the better degree of efficiency compared to the belt drive transmission 4, the total degree of efficiency of the transmission is thus very favorable in this frequently required speed range.

For example when loading or stacking, the reversing is effected by a controlled or regulated shift of the clutches Kv and Kr. To this end, the transmission has not adjusted to the minimum ratio. The transmission ratio is adjusted to one value favorable to the work at hand. The reversing is then controlled or regulated only by the transmission torque of the clutches Kv and Kr.

REFERENCE NUMERALS

Kv clutch for forward drive
Kr clutch for reverse drive
K1 clutch
K2 clutch
1 input shaft
2 twin clutch
3 countershaft
4 belt drive transmission
5 primary bevelled pulley pair
6 looping organ
7 secondary bevelled pulley pair
8 intermediate shaft
9 spur gear
10 spur gear
11 idler gear
12 planetary transmission
13 sun gear
14 planet carrier
15 ring gear
16 intermediate shaft
17 spur gear
18 spur gear
19 spur gear
20 spur gear
21 spur gear
22 creep speed group
23 shaft
24 spur gear
25 spur gear
26 hollow shaft
27 countershaft
28 spur gear
29 spur gear
30 idler gear
31 output shaft
32 bevel gear
33 rear gear differential
34 spur gear
35 spur gear
36 engaging clutch

What is claimed is:

1. A continuously variable transmission with first and second driving modes having
    a transmission input shaft (1) and an output shaft (23);
    a continuously adjustable rotational speed variator (4) drivingly connected with said transmission input shaft (1);
    a mechanical power branch drivingly connected with said transmission input shaft (1);
    a planetary transmission (12) in the form of a compound gear which has first and second inputs and one output and
    a first, second, and third clutch (K1, K2, Kv) for forward drive, and a fourth clutch (Kr) for reverse drive;
    wherein in a first driving mode power from the variator is fed to the first input of the planetary transmission and power from the mechanical power branch, via the first clutch (K1), is fed to the second input of the planetary transmission, the combined power being passed on the output of the planetary transmission; and
    wherein in a second driving mode, when the first clutch (K1) is open and the second clutch (K2) is closed, the power from the variator is then connected with the output of the planetary transmission (12);
    wherein the output of the planetary transmission (12) in both driving modes can be optionally connected with the output shaft (23) via said third clutch (Kv) for forward drive or via said fourth clutch (Kr) for reverse drive;
    said third and fourth clutches (Kv, Kr) being situated downstream of the output of the variator and the mechanical power branch is designed as two-way clutches (2) which serve as start clutch and reverse unit.

2. The continuously variable transmission according to claim 1, wherein said two-way clutch is solidly designed so that for arbitrarily adjusted ratios in the first driving mode start or reverse operation can take effect exclusively by actuating said two-way clutch (2) without a ratio adjustment.

3. The continuously variable transmission according to claim 1, wherein between the transmission input shaft (1) and the variator a reduction step is disposed to increase driving ratio.

4. The continuously variable transmission according to claim 1, wherein the variator is a belt drive transmission (4).

5. The continuously variable transmission according to claim 1, wherein a creep speed gear group of a countershaft design is situated on the output side of said two-way clutch (2).

6. The continuously variable transmission according to claim 1, wherein the transmission ratio range in the driving mode is greater than the ratio range of the variator.

7. A method for operating a continuously variable transmission according to claim 1, wherein at the switching point at which the first clutch (K1) is closed and the second clutch (K2) is opened and vice versa, the sun gear (13), ring gear (15) and planet carrier (14) of the compound planetary gear (12) rotate synchronously.

* * * * *